(12) United States Patent
Bretagnol et al.

(10) Patent No.: US 10,953,855 B2
(45) Date of Patent: Mar. 23, 2021

(54) DEVICE FOR PROTECTING AN OPTICAL SENSOR, AND ASSOCIATED DRIVING ASSISTANCE SYSTEM AND CLEANING METHOD

(71) Applicant: Valeo Systèmes d'Essuyage, Le Mesnil Saint Denis (FR)

(72) Inventors: Frédéric Bretagnol, Issoire (FR); Giuseppe Grasso, Issoire (FR); Grégory Kolanowski, Issoire (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/461,951

(22) PCT Filed: Nov. 17, 2017

(86) PCT No.: PCT/EP2017/079552
§ 371 (c)(1),
(2) Date: May 17, 2019

(87) PCT Pub. No.: WO2018/091635
PCT Pub. Date: May 24, 2018

(65) Prior Publication Data
US 2020/0254979 A1    Aug. 13, 2020

(30) Foreign Application Priority Data
Nov. 17, 2016 (FR) ........................ 1661120

(51) Int. Cl.
*B60S 1/56* (2006.01)
*B60S 1/08* (2006.01)
*B60R 11/04* (2006.01)

(52) U.S. Cl.
CPC ............... *B60S 1/56* (2013.01); *B60S 1/0848* (2013.01); *B60R 11/04* (2013.01)

(58) Field of Classification Search
CPC ........... B60S 1/56; B60S 1/0848; B60R 11/04
(Continued)

(56) References Cited

U.S. PATENT DOCUMENTS 10,179,571 B1 * 1/2019 Matesic .................... B60S 1/56
134/6
2007/0217782 A1 * 9/2007 McCutchen ........... G03B 17/08
396/427

(Continued)

FOREIGN PATENT DOCUMENTS

AU     2006/060868    *  6/2016   ......... G02B 27/0006
CN     203 422 547 U    2/2014
(Continued)

OTHER PUBLICATIONS

International Search Report and Written Opinion in corresponding International Application No. PCT/EP2017/079552, dated Feb. 28, 2018 (20 pages).

(Continued)

*Primary Examiner* — Marnie A Matt
(74) *Attorney, Agent, or Firm* — Osha Bergman Watanabe & Burton LLP

(57) ABSTRACT

The invention relates to a device (3) for protecting an optical sensor (13) for a motor vehicle. According to the invention, the protection device (3) comprises: a housing (4) which is mounted in such a way that it rotates about a rotational axis (A1) and has a receiving element (19) designed to receive the optical sensor (13) such that the optical axis (15) of the optical sensor (13) merges with the rotational axis (A1), a transparent optical element (9) constrained to rotate with the housing (4) and designed to be arranged in front of the (Continued)

Figure 1:
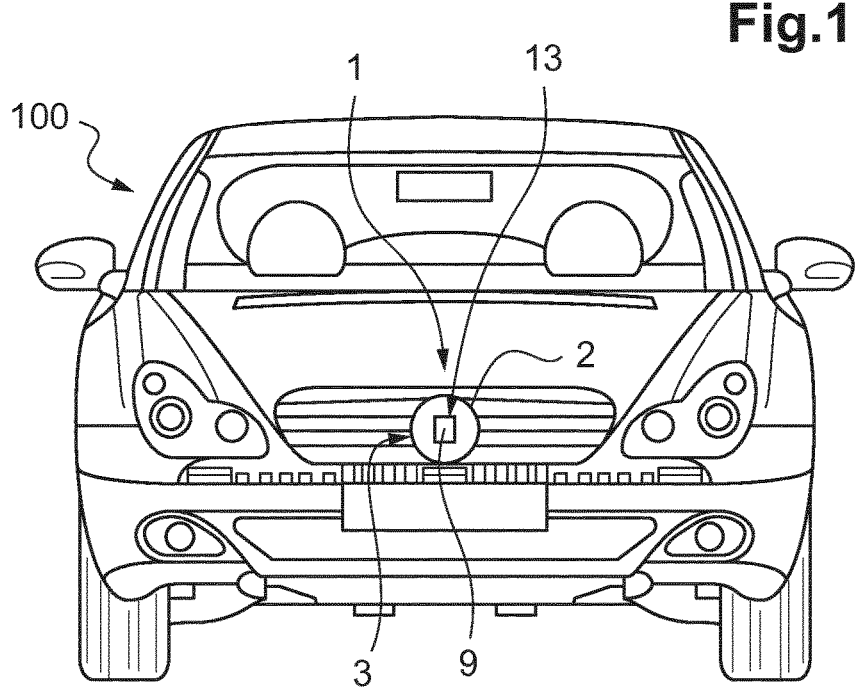

housing (4) facing the road and such that it is centred in relation to the optical sensor (13), and an actuator (5) for rotating the housing (4), so as to clean said optical element (9) by means of a centrifugal effect. The invention also relates to a driving assistance system (1) corresponding in this way to a cleaning method implementing such a protection device (3).

13 Claims, 4 Drawing Sheets

(58) Field of Classification Search
USPC .......................................................... 348/148
See application file for complete search history.

(56) References Cited

U.S. PATENT DOCUMENTS

| 2011/0073142 | A1* | 3/2011 | Hattori | B60S 1/56 |
| | | | | 134/56 R |
| 2011/0181725 | A1 | 7/2011 | Matsuura et al. | |
| 2012/0000024 | A1* | 1/2012 | Layton | H04N 5/225 |
| | | | | 15/97.1 |
| 2013/0028588 | A1* | 1/2013 | Suman | B60R 11/04 |
| | | | | 396/448 |
| 2015/0090291 | A1* | 4/2015 | Na | B60S 1/56 |
| | | | | 134/6 |
| 2015/0353057 | A1* | 12/2015 | Witte | B60R 11/04 |
| | | | | 396/448 |

FOREIGN PATENT DOCUMENTS

| GB | 2299560 A | 10/1996 |
| JP | H04-116834 U | 10/1992 |
| JP | 2011-155468 A | 8/2011 |
| JP | 2016-058025 A | 4/2016 |
| JP | 2016-168996 A | 9/2016 |
| JP | 2017-165287 A | 9/2017 |
| KR | 2007 0034729 A | 3/2007 |
| WO | 2006-060868 A2 | 6/2006 |

OTHER PUBLICATIONS

Notice of Reason for Rejection in corresponding Japanese Application No. 2019-526303, dated Jun. 9, 2020 (14 pages).
Notice of Reason for Rejection in corresponding Japanese Application No. 2019-526303, dated Nov. 17, 2020 (7 pages).

* cited by examiner

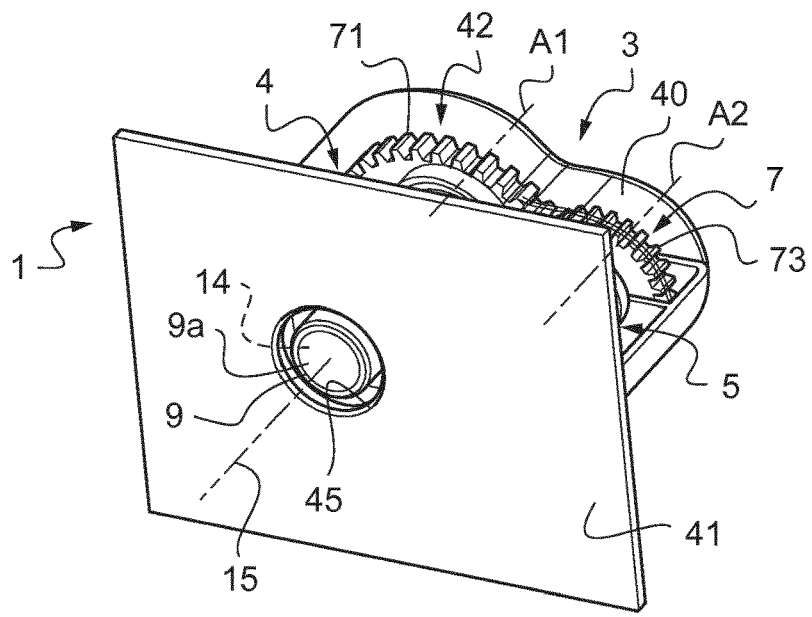
Fig.3
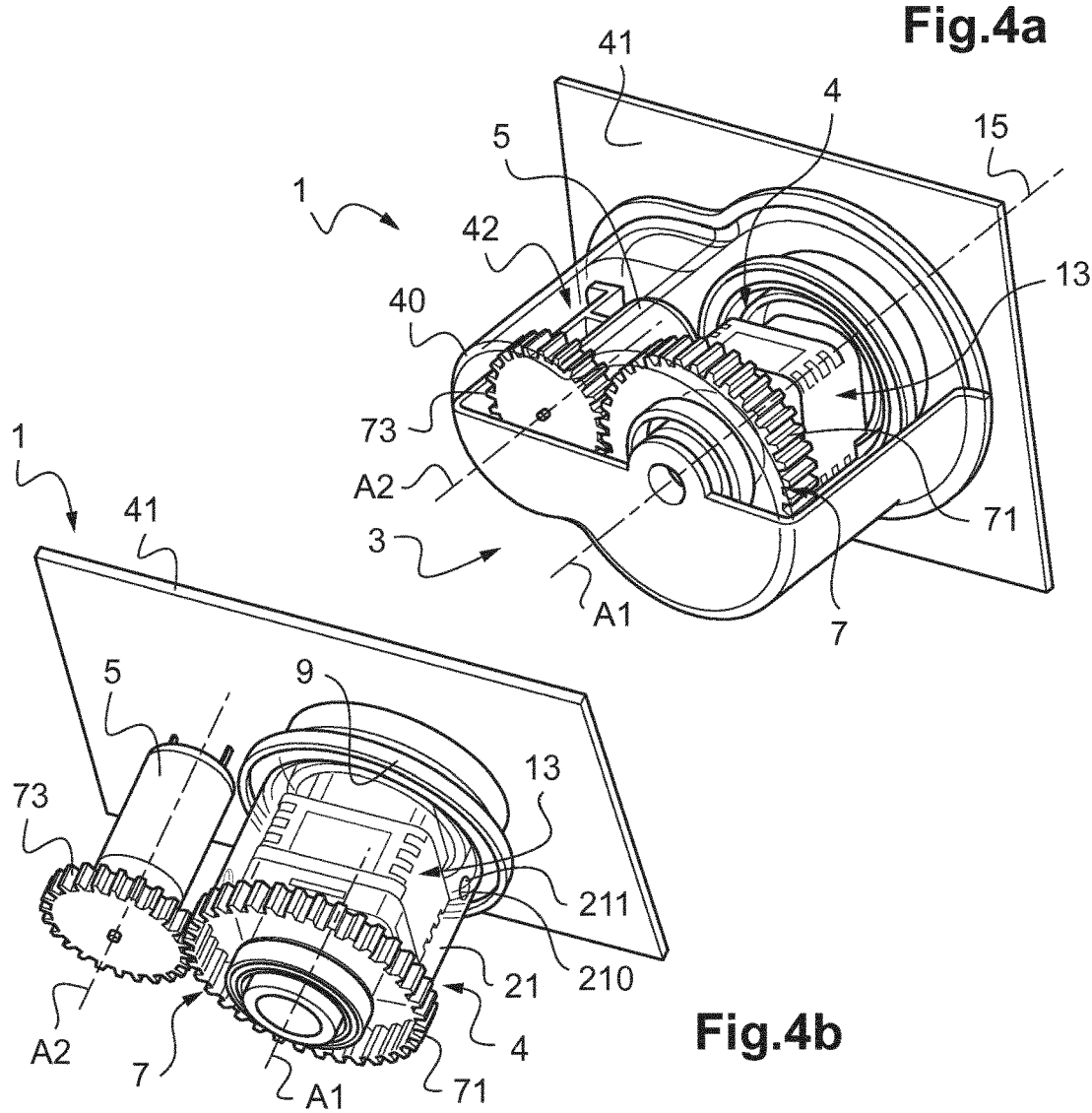
Fig.4a
Fig.4b

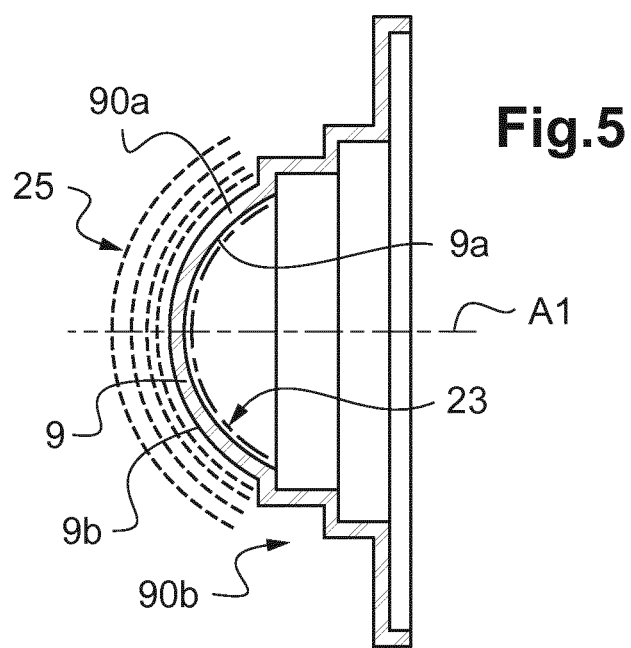
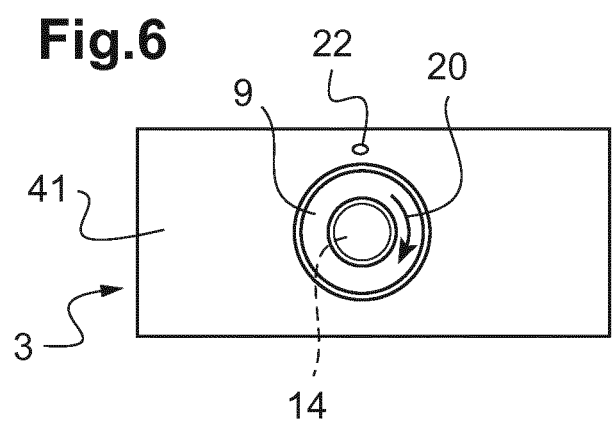

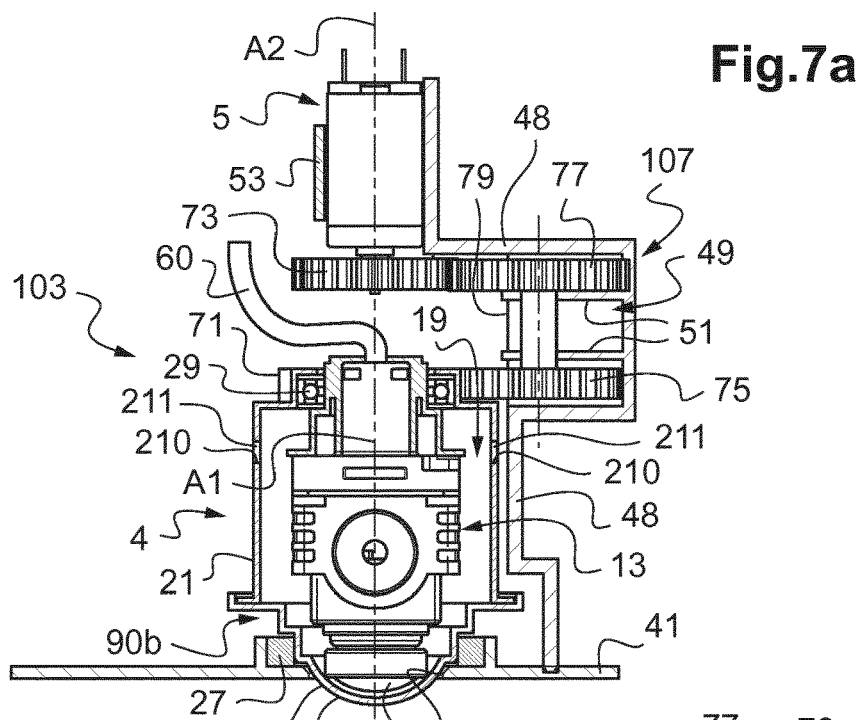
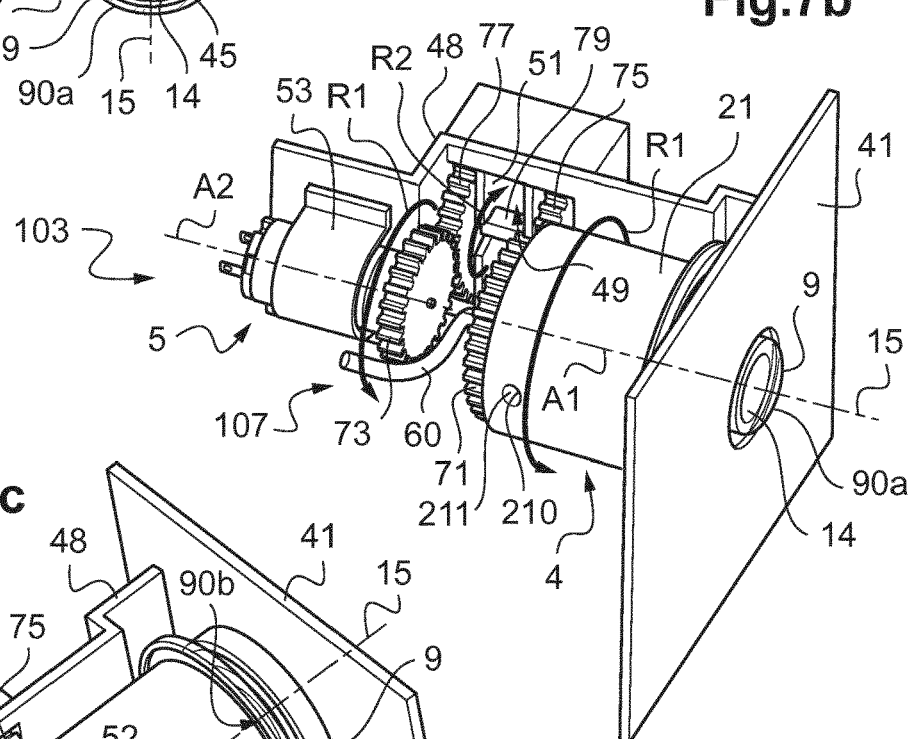
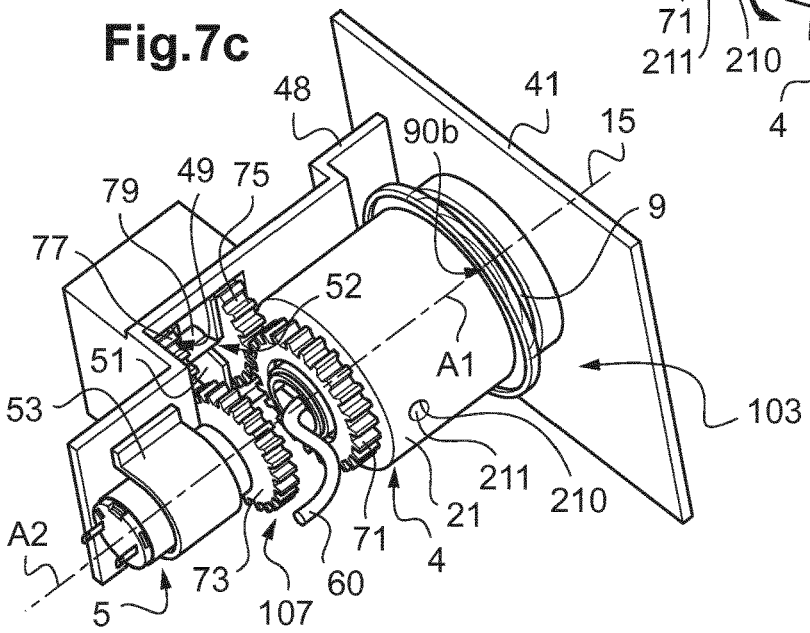

DEVICE FOR PROTECTING AN OPTICAL SENSOR, AND ASSOCIATED DRIVING ASSISTANCE SYSTEM AND CLEANING METHOD

The present invention relates to the field of driving assistance and in particular to the driving assistance systems installed on some vehicles, possibly including an optical sensor, such as a video camera including a lens for example. The invention more particularly concerns a device for protecting this kind of optical sensor. The invention equally concerns a method of cleaning an optical element of this kind of protection device.

At present front, rear and side vision video cameras equip a large number of motor vehicles. They form in particular part of driving assistance systems, such as parking assistance systems, or of systems for detecting line crossing.

There are known video cameras that are installed inside the passenger compartment of a vehicle against the rear window and aimed rearward from the rear window of the vehicle. These video cameras are well protected from exterior climatic problems and dirt caused by organic or mineral pollutants. However, the viewing angle of this kind of such video camera, installed inside the passenger compartment, is not the optimum, in particular for parking assistance, as it does not enable obstacles in the vicinity of the rear of the vehicle to be seen, for example.

For this reason it is therefore preferred to install the video cameras of the driving assistance system on the outside of the vehicle at various locations depending on the intended use, for example at the level of the front or rear bumper or at the level of the front or rear number plate of the vehicle. In this case the video camera is therefore very exposed to splashed mineral or organic dirt that may be deposited on its optic and therefore reduce its efficacy or even render it inoperative. In particular during rainy weather splashing with rainwater and dirt are observed that can greatly affect the operability of the driving assistance system including this kind of video camera. The surfaces of the optics of the video cameras must be cleaned in order to guarantee a good operational status thereof.

To counter the deposition of dirt on the camera, it is known to arrange a device for cleaning the optics of the video camera, generally a cleaning liquid sprayer, in the vicinity thereof, to eliminate the polluting elements that are deposited over time. However, the use of these nozzles leads to an increased cost of operating a driving assistance system of this kind because they necessitate the use of relatively large quantities of cleaning liquid. Also, the optic of the video camera, which is relatively fragile, is not protected from spraying that might damage it.

It is also known to mount the video camera inside the external bodywork of the vehicle and to protect it from external aggression by means of a protecting glass or window fixed to the bodywork and arranged facing the lens. Although the video camera is protected from external aggression, the protecting glass or window remains subject to the deposition of pollutants.

In one known solution means are provided for vibrating the protecting glass facing the video camera in order to detach the dirt from the glass protecting the video camera. However, it has been found that the efficacy of a device of this kind for tenacious and encrusted dirt may be limited despite the vibration of the protecting glass.

In another solution the protection device includes a housing inside which the video camera is arranged and a rotating cover closing that housing and the rotation axis of which is eccentric relative to the optical axis of the camera. The protecting device also includes a wiper blade.

However, this kind of protection device may be noisy if the cover is rotated at high speeds, in particular because of rubbing between the cover and the wiper blade. Also, the wiper blade may suffer premature wear because of the continuous rotation at relatively high speed of the cover. Also, a protection device of this kind may be relatively bulky to install because the rotating cover is eccentric relative to the optical sensor and has a diameter at least twice the diameter of the optic of the optical sensor that it protects and of which it assures good operability. Afterwards, it is possible that microscratches appear on the cover if solid particles are deposited between the wiper blade and the rotary cover. The field of view and the quality of the images captured by the optical sensor may be affected by this. Finally, the use of this kind of protection system does not enable a wide viewing angle because of the arrangement of the optical sensor inside the housing carrying the cover, unless this housing projects.

The present invention proposes to remedy at least in part the disadvantages mentioned above by offering an alternative device for protecting an optical sensor enabling prevention of the deposition of dirt on the optical sensor, such as a video camera, whilst retaining a wide angle of view.

To this end the object of the invention is a device for protecting a motor vehicle optical sensor.

According to the invention, the protection device includes:

a housing mounted to be mobile in rotation about a rotation axis, the housing including a receptacle configured to receive the optical sensor so that the optical axis of the optical sensor coincides with the rotation axis, a transparent optical element constrained to rotate with the housing and configured to be disposed in front of the housing facing a road scene the optical sensor is configured to participate in imaging and in a manner centered relative to the optical sensor, and an actuator coupled to the housing to drive the housing in rotation, so as to enable cleaning of said optical element by centrifugal effect.

A protection device of the above kind may be installed on an optical sensor intended to be installed inside a bodywork element of the vehicle or on the outside of the vehicle whilst enabling the optical sensor to retain a wide angle of view.

Dirt may be deposited on the optical element when it is raining or in dry weather. By "dirt" is meant both water droplets and organic or mineral pollutants. When the housing and the optical element are driven in rotation by the actuator, any dirt is ejected by a centrifugal effect. In fact, the centrifugal force generated in this way is greater than the force of adhesion of the dirt to the optical element.

Also, the housing being fastened to the optical element, a sealed unit is formed, therefore preventing the entry of dirt into the interior of the housing intended to receive the optical sensor, commensurately further improving the protection of the optical sensor.

The optical sensor therefore retains good operability and soiling thereof is limited whatever the climatic conditions.

According to one feature of the invention, the actuator is on the outside of the housing, i.e. alongside or set back at a distance from the housing. The shape and the size of the actuator are therefore distinct from those of the housing intended to receive the optical sensor and it is possible to provide a standard actuator able drive in rotation housings of different sizes, chosen as a function of the type of optical sensor to be accommodated. Also, the fact that the actuator is at a distance from the housing enables actuator maintenance operations to be distinguished from optical sensor maintenance operations, thus facilitating such maintenance if only one component is faulty.

Said device for protecting the optical sensor may further include one or more of the following features, separately or in combination:
- the receptacle for the optical sensor is defined by a wall of the housing; the wall of the housing is disposed between the actuator and the optical sensor;
- the housing and the optical element are made in one piece or as a plurality of pieces fastened together;
- the wall is centered around the rotation axis of the housing;
- the housing includes at least one through-orifice;
- the actuator is disposed at the rear of the housing;
- the actuator is disposed to one side of the housing;
- the actuator is coupled to the housing by a coupling means chosen in particular from gears, a gear train, a belt, an elastic drive cylinder, a roller;
- the coupling means is disposed at least in part on the opposite side to said optical element; a distal end of the housing may in particular be defined as the end opposite the optical element and the coupling means includes a part associated with the housing that is produced at the level of that distal end;
- the coupling means is disposed on an external face of a wall delimiting the housing, said external face facing away from the optical sensor accommodated in the housing; in particular, the coupling means is disposed on an external face of a lateral wall delimiting the housing, the lateral wall being parallel to the rotation axis of the housing accommodating the optical sensor;
- said optical element is distinct from the optical sensor;
- said optical element has an internal surface having an anti-mist property, in particular the internal surface of said optical element has an anti-mist coating;
- said optical element has an external surface having at least one property chosen from the following list: infrared filter, photocatalytic, hydrophobic, superhydrophobic, lipophobic, hydrophilic, superhydrophilic, gravel resistance.

The invention also concerns a driving assistance system including an optical sensor and a device as defined above for protecting the optical sensor.

According to one aspect of the invention, the driving assistance system further includes:
- a detection means such as a capacitive sensor configured to detect the approach of an object in the vicinity of said optical element, and
- a means for inhibiting the rotation of the housing on detection of the approach of an object in the vicinity of said optical element.

The invention further concerns a method of cleaning an optical element of a device for protecting an optical sensor as defined above, said method including at least one step of driving in rotation the housing and said optical element to clean said optical element by a centrifugal effect.

According to one aspect of the invention, said method includes at least two cleaning steps with a different rotation speed of the housing and of said optical element for each step.

Figure 2:
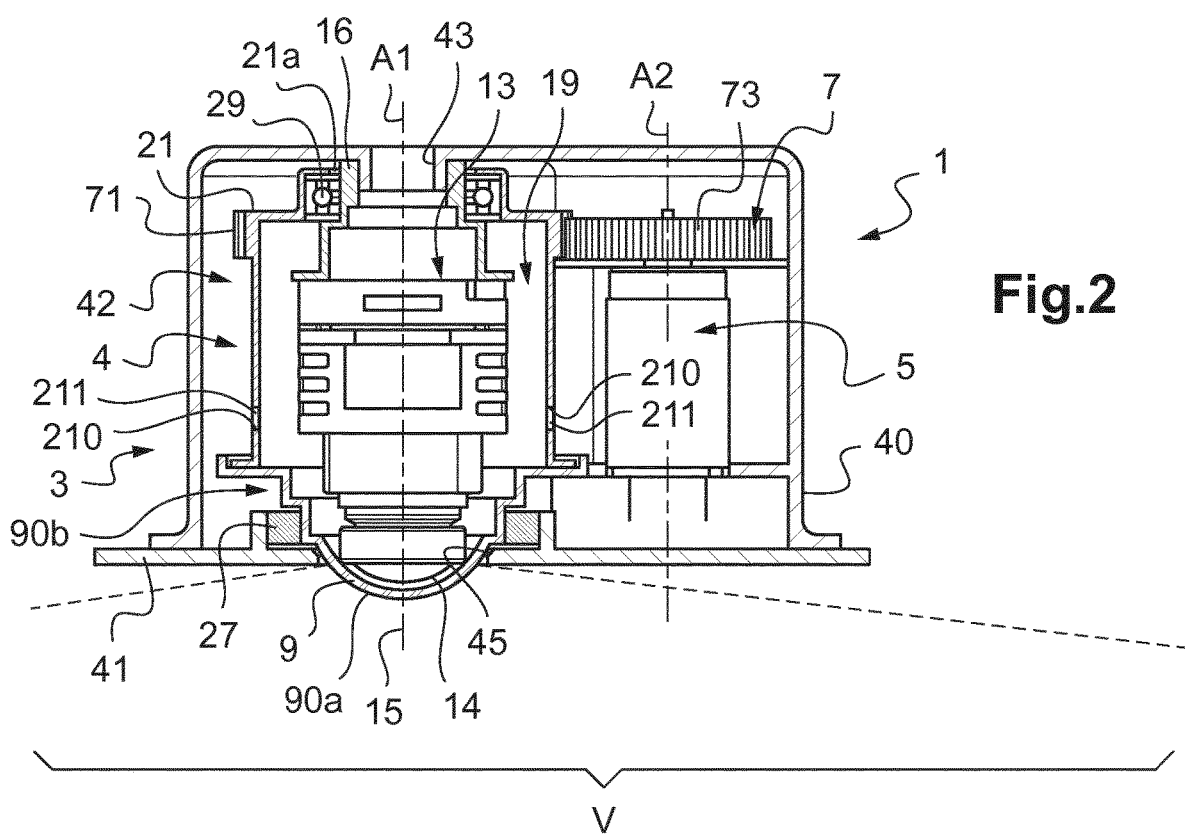

Other features and advantages of the invention will become more clearly apparent on reading the following description given by way of illustrative and nonlimiting example and from the appended drawings, in which:

FIG. 1 represents diagrammatically a motor vehicle including a driving assistance system according to the invention, FIG. 2 is a partial view in longitudinal section of a first embodiment of a device for protecting an optical sensor of the assistance system from FIG. 1, FIG. 3 is a perspective view from the front of the device for protecting the optical sensor from FIG. 2, FIG. 4a is a perspective view from the rear of the device for protecting the optical sensor from FIG. 2 mounted in a unit to be fixed to an element of the vehicle, FIG. 4b is another perspective view from the rear of the device for protecting the optical sensor from FIG. 2 in which the fixing unit has been removed, FIG. 5 is a sectional view of an optical element of the protection device, FIG. 6 is a front view of the device for protecting the optical sensor according to a variant with a fluid spray nozzle, FIG. 7a is a partial view in longitudinal section of a second embodiment of a device for protecting the optical sensor, FIG. 7b is a first perspective view of the device for protecting the optical sensor from FIG. 7a, and FIG. 7c is a second perspective view of the device for protecting the optical sensor from FIG. 7a.

In these figures identical elements bear the same references.

The following embodiments are examples. Although the description refers to one or more embodiments, that does not necessarily mean that each reference concerns the same embodiment or that the features apply only to only one embodiment. Single features of different embodiments may equally be combined or interchanged to produce other embodiments.

In the description some elements may be indexed, for example as a first element or a second element. In this case, this is merely indexing to differentiate and to name similar but not identical elements. This indexing does not imply any priority of one element over another and such names may easily be interchanged without departing from the context of the present description. Nor does this indexing imply any temporal order.

FIG. 1 shows a motor vehicle 100 equipped with at least one driving assistance system 1 according to the invention.

The driving assistance system 1 includes in particular at least one optical sensor 13 and a device 3 (FIG. 1 to 6) or 103 (FIGS. 7a to 7c) for protecting the optical sensor 13.

The optical sensor 13 is for example an imaging optical sensor 13 such as a video camera. It may be a CCD (charged-coupled device) sensor or a CMOS sensor including a matrix of miniature photodiodes. In another variant, it may be a laser remote sensing sensor known as an LIDAR (light detection and ranging) sensor.

As is seen better in FIG. 2, the optical sensor 13 includes an optic 14 having an optical axis 15. The optic 14 is for example a lens. This optic 14 is for example convex (domed) with its convexity oriented toward the exterior of the optical sensor 13, such as a so-called fish-eye optic.

Also, in the particular embodiment shown, the optical sensor 13 may include a connecting piece 16 disposed around the rear end of the optical sensor 13, in other words on the side opposite the optic 14. This connecting piece 16 is in the particular embodiment shown of substantially cylindrical shape, for example having a varying section.

In the embodiments shown, the optical sensor 13 is mounted in the protection device 3 (FIG. 1 to 6) or 103 (FIGS. 7a to 7c).

In the example shown in FIG. 1, the protection device 3 is mounted at the front of the vehicle 100 at the level of a bumper. Of course, the protection device 3 may instead be mounted at the rear of the vehicle 100, for example at the level of the bumper or of the number plate. It may also for example be mounted on the sides of the vehicle, for example at the level of the wing mirrors.

The protection device 3 may be fixed using any known technique to any element 2 of the vehicle 100, such as a bodywork element or an external element such as a bumper, a wing mirror or a number plate. To this end there may be cited non-exhaustively a system of clips, a system of screws, or a gluing system.

A first embodiment of the protection device 3 is described with reference to FIGS. 2 to 6.

The protection device 3 advantageously includes a housing mounted to be mobile in rotation about a rotation axis A1, as shown in FIGS. 2 to 4b.

The protection device 3 may further include an actuator 5 coupled to the housing 4 to drive the housing 4 in rotation. In particular a coupling means 7 is provided for this purpose between the housing 4 and the actuator 5.

Also, the protection device 3 includes a transparent optical element 9 seen better in FIGS. 2 and 3. The optical element 9 is mounted so as to be constrained to rotate with the housing 4 and is configured to be disposed in front of the housing 4. By the front of the housing 4 is meant the part of the housing 4 intended to face the road scene which the optical sensor 13 participates in imaging when the protection device 3 is mounted on the vehicle 100 (FIG. 1). Conversely, the rear of the housing 4 means the part of the housing 4 opposite the front of the housing 4; the rear of the housing 4 is therefore the part at the greatest distance from the road scene which the optical sensor 13 participates in imaging.

The optical element 9 is therefore configured to be driven in rotation with the housing 4 so as to enable cleaning of the optical element 9 by a centrifugal effect.

Where the housing 4 is more precisely concerned, the latter includes a receptacle 19 (see FIG. 2) configured to receive the optical sensor 13 so that the optical axis 15 of the optical sensor 13 coincides with the rotation axis A1 of the housing 4. The housing 4 is preferably a sealed housing.

The housing 4 includes a wall 21 defining the receptacle 19 for the optical sensor 13. This wall 21 is centered around the rotation axis A1 of the housing 4. In this embodiment the wall 21 has a substantially cylindrical general shape as seen better in FIG. 4b.

In a first variant, the wall 21 may be produced in one piece with the optical element 9 (FIG. 2).

In a second variant the wall 21 and the optical element 9 may be two separate parts and in this case the wall 21 is fastened to one end of the optical element 9. It is in particular the front end of the wall 21 that is fastened to the optical element 9. As before, the front is defined as the part closest to the road scene. By way of nonlimiting example, the wall 21 and the optical element 9 may be fastened together by ultrasound welding.

Thus the housing 4 and the optical element 9 may be produced in one or more parts.

The housing 41, in particular the wall 21, may be made from any appropriate material known to the person skilled in the art, for example aluminum or a thermally-conductive polycarbonate.

Also, the wall 21 advantageously includes an opening 21a around the connecting part 16 at the rear of the optical sensor 13 when the optical sensor 13 is inside the housing 4.

Alternatively or additionally there is advantageously provided at least one means for limiting condensation, referred to hereinafter as anticondensation means. Anticondensation means of this kind may be provided at the level of the housing 4. In particular at least one anticondensation means may be arranged on the wall 21 of the housing 4.

By way of nonlimiting example the anticondensation means may include at least one through-orifice 210 (see FIG. 2) at the level of the housing 4, in this embodiment on the wall 21. The orifice or orifices 210 may be drilled. If a plurality of orifices 210 are provided, they are preferably symmetrically arranged with respect to the rotation axis A1 of the housing 4.

In the example shown in FIG. 2, two orifices 210 are provided, symmetrically arranged relative to the rotation axis A1 of the housing 4. The orifices 210 provide communication between the interior of the housing 4 and the exterior of the housing 4 when the protection device 3 is assembled as shown in FIG. 2. By way of nonlimiting example each orifice 210 may have a diameter of the order of 5 mm.

Also, the orifices 210 may be placed on the housing on the same side as the optical element 9, as in the example shown in FIGS. 2 and 4. In the example shown in FIGS. 7a-c the orifices are positioned on the wall 21 opposite the optical element 9.

Also there may be provided one or more semi-permeable membranes 211 respectively arranged at least at the level of an orifice 210 (FIG. 2). In the example shown in FIG. 2, two membranes 211 are represented diagrammatically. Each membrane 211 may be fixed, for example glued or ultrasound welded, to an associated orifice 210 in a sealed manner.

In the embodiments described these membranes 211 are permeable to air and impermeable to water. The membrane or membranes 211 therefore favor(s) the circulation of air inside the housing 4. This enables good ventilation between the optic 14 and the optical element 9 and therefore prevents the accumulation of condensation.

A means for compensating the mass removed at the level of the orifice 210 or of the orifices 210 is advantageously further provided. In the particular embodiment shown in FIG. 2, with two orifices 210 symmetrical with respect to the rotation axis A1 of the housing 4, the two membranes 211 are also placed symmetrically with respect to the rotation axis A1 of the housing 4 and it is this symmetrical arrangement that makes it possible to limit the effects of mass on the centrifugal force upon rotation of the housing 4.

For its part, the optical element 9 is intended to protect the optic 14 of the optical sensor 13 from possible sprayed dirt or solid debris that could degrade the optic 14. It is therefore a protection element or to be more precise a mask for protecting the optical sensor 13 and it is this optical element 9 that is subjected to external aggression, i.e. both sprayed water, pollutants and gravel and deposits of pollutants or traces of water.

This optical element 9 may be made of glass or a transparent plastic material such as polycarbonate.

In this embodiment the optical element 9 is mounted to rotate about the rotation axis A1. The optical element is centered relative to the rotation axis A1. The optical element 9 in particular has circular symmetry with respect to the rotation axis A1.

When the protection device 3 is assembled the optical element 9 is arranged to be centered relative to the optical sensor 13, to be more precise centered relative to the optic 14.

As stated above, the optical element 9, made in one piece with the wall 21 or fastened to one end of that wall 21, is arranged at the front of the housing 4.

In a variant, the optical element 9 is distinct from the optical sensor 13. In this case the optical element 9 is intended to be disposed upstream of the optical sensor 13, to be more precise upstream of the optic 14. Herein the term upstream is defined relative to the optical axis 15 and relative to the road scene which the optical sensor 13 participates in imaging. In other words, there is meant by "upstream" of the optic 14 a position in which the optical element 9 is on the optical axis 15 between the optic 14 and the road scene which the optical sensor 13 participates in imaging.

In another variant the optical element 9 may be formed by a part of the optical sensor 13 such as an external lens of the optic 14 of the optical sensor 13. In this case the optical element 9 is also disposed on the optical axis 15 upstream of the optic 14, i.e. between the optic 14 and the road scene which the optical sensor 13 participates in imaging.

In either of the above variants, the optical element 9 being disposed upstream of the optic 14 of the optical sensor 13, making it from a transparent material enables prevention of degrading of the efficacy of the optical sensor 13.

Also, referring to FIGS. 1 to 3, in either of the above variants the protection device 3 receiving the optical sensor 13 is mounted on the vehicle 100 the optic 14 and the optical element 9 project from an opening in the element 2 of the vehicle 100. With an arrangement of this kind the optical sensor 13 has a wide angle of view V schematically delimited by the dashed lines in FIG. 2 and the optic 14 stays clean because of the presence of the optical element 9 between the optic 14 and the outside of the vehicle 100 (FIG. 1).

Also, in either of the variants of the optical element 9, i.e. distinct from or forming part of the optical sensor 13, the optical element 9 has dimensions so as to cover all of the surface of the optic 14 (see FIGS. 2 and 3).

To this end, when the optical element 9 is distinct from the optical sensor 13, the optical element 9 may include:
- a part forming a mask 90a intended to be arranged facing the optic 14 of the optical sensor 13, and
- in line with that mask 90a, a retaining part 90b (FIG. 2) intended to come to surround the front part of the optical sensor 13 including the optic 14, i.e. the part of the optical sensor 13 intended to face the road scene which the optical sensor 13 participates in imaging.

Of course, the retaining part 90b has a shape complementary to the shape of the front part of the optical sensor 13 it is intended to surround. In the example shown, this retaining part 90b may have a substantially stepped shape that extends the front part of the optical element 9 forming the mask 90a. This stepped shape of the optical element 9 is seen better in FIGS. 2 and 5. Also, the retaining part 90b of the optical element 9 is the part that is fixed to the front end of the wall 21 of the housing 4 (see FIG. 2) when the optical element 9 is not made in one piece with that wall 21.

The optical element 9 advantageously has a general shape substantially similar to the shape of the optic 14. In this example, the optical element 9 is at least in part of substantially convex shape, with a curvature substantially parallel to the curved surface of the optic 14 of the optical sensor 13. This convex part of the optical element 9 has for example a diameter close to that of the optic 14 of the optical sensor 13.

In the example shown it is the part forming the mask 90a, intended to be arranged directly facing the optic 14 of the optical sensor 13, that has this substantially convex shape.

In an alternative not shown here the optical element 9, when it is distinct from the optical sensor 13, may be at least in part substantially plane.

The optic 14 is therefore protected from being sprayed with dirt such as organic or mineral pollutants, water or a combination of those various elements liable to damage it. Also, when the housing 4 and the optical element 9 are driven in rotation the centrifugal force to which any dirt is subjected is greater than the adhesion of that dirt to the optical element 9. Any dirt deposited on the external surface of the optical element 9 is therefore ejected from the optical element 9 and does not interfere with the field of view V of the optical sensor 13.

Also, in order to prevent condensation between the optic 14 and the optical element 9 the internal surface 9a of the optical element 9 (see FIG. 5) advantageously has an antimist property. The internal surface 9a of the optical element 9 is the surface intended to be arranged facing the optic 14 of the optical sensor 13. In particular the internal surface 9a of the optical element 9 has an antimist coating represented schematically by a circular arc shaped chain-dotted line 23.

The external surface 9b of the optical element 9 may alternatively or additionally have one or more of the following properties: hydrophobic, infrared filter, photocatalytic, superhydrophobic, lipophobic, hydrophilic or superhydrophilic, gravel resistance, or any other surface treatment enabling reduction of the adhesion of dirt.

In particular, thanks to the hydrophobic properties of the external surface 9b of the optical element 9 any water droplets will trickle over the external surface 9b without leaving traces because water is not able to adhere to this external surface 9b.

The layers or coatings on the external surface 9b of the optical element 9, represented schematically by circular sector shaped dashed lines 25 in FIG. 5, therefore make it possible to limit the possibility of adhesion of organic or mineral pollutants and the presence of traces of water on the optical element 9 liable to degrade the correct operation of the driving assistance system 1. A liquid solution, such as a solution of Rain-X® type, may advantageously be deposited, for example periodically and manually, on the external surface 9b of the optical element 9 in order to form a hydrophobic film.

The optical element 9 of the protection device 3 may optionally also include an integrated deicing or demisting system to be able to guarantee good operability of the driving assistance system 1 regardless of the meteorological conditions, such as a deicing resistance element or filament for example.

Also, referring again to FIGS. 1 and 2, the optical element 9 and more generally the whole of the protection device 3 may be mounted on the element 2 provided on the vehicle 100 by way of a retaining and fixing means, for example comprising a unit 40 that may take the form of a fixing plate 41 (FIG. 2).

After the protection device 3 has been assembled, the unit 40 may be fastened to the fixing plate 41 by any appropriate means, by way of example by welding, screwing or gluing. The fixing plate 41 may for example be fixed by any means to an element 2 such as a bodywork element of the vehicle 100 (FIG. 1).

Referring again to FIGS. 2 to 4a, the unit 40 includes a receptacle 42 configured to receive the housing 4 accommodating the optical sensor 13 and fastened to the optical element 9, the actuator 5 and the coupling means 7. The block 40 may have a substantially cylindrical general shape and is open at its front end, i.e. on the side intended to face the road scene which the optical sensor 13 participates in imaging, so as to enable introduction of the housing 4, the actuator 5 and the coupling means 7 into the receptacle 42.

The unit 40 advantageously includes a passage 43 for cables (not shown in FIGS. 2 to 4*a*) necessary for the optical sensor 13 to function so as to enable connection of the optical sensor 13 received in the housing 4 to the interior of the receptacle 42, for example to an electrical power supply of the optical sensor 13, and/or cables enabling transmission of images captured by the optical sensor 13 to at least one image processing means (not shown) of the vehicle 100 (FIG. 1). This passage 43 is at the rear of the unit 40, for example substantially at its center. In particular, this passage 43 faces the rear end of the optical sensor 13, in other words is on the opposite side to the optic 14 when the optical sensor is mounted in the housing 4 which is itself mounted in the unit 40. The passage 43 for cables or wires is advantageously protected in a sealed manner to limit the entry of water vapor and/or other contaminants into the housing 4.

The fixing plate 41 includes an opening 45 (FIGS. 2 and 3) for the passage of the optical element 9 and of the optic 14 of the optical sensor 13 to allow a view toward the outside. This opening 45 is for example adapted to be arranged facing a complementary opening in the element 2 of the vehicle 100 so that once the retaining and fixing means 40, 41 have been installed on the element 2 of the vehicle 100 the optic 14 of the optical sensor 13 and the optical element 9 project from the opening 45 in the fixing plate 41 and the opening in the element 2 of the vehicle 100 (see FIGS. 1 and 2).

Also, referring to FIG. 6, in order to improve the cleanliness of the optical element 9, in an optional alternative the protection device 3 may further includes at least one nozzle 22 for spraying a fluid, in particular a cleaning and/or drying fluid, onto the optical element 9. This nozzle 22 may be situated above the optical element 9, for example on the fixing plate 41. In other embodiments not shown here the nozzle 22 may be situated at any location in the vicinity of the optical element 9.

The fluid projected by the nozzle 22 may be compressed air or a cleaning liquid in order to clean the optical element 9 if causing the latter to rotate is not sufficient to eliminate the various kinds of dirt that have been deposited on it. Alternatively, spraying fluid may be used in a manner complementary to the rotation of the optical element 9 in order to ensure optimum cleanliness of the latter. In FIG. 6 the arrow 20 shows the direction of rotation of the optical element 9, for example the clockwise direction. Of course this rotation may be effected in the anticlockwise direction in other embodiments not shown here.

Also, in other embodiments not shown here the protection device 3 may include a plurality of nozzles 22. The protection device 3 may for example include a first nozzle 22 configured to spray a first fluid such as cleaning liquid and a second nozzle configured to spray a second fluid such as compressed air onto the optical element 9.

The nozzle or nozzles 22 may be connected to the cleaning liquid distribution system of the vehicle 100 (FIG. 1). Alternatively, the protection device 3 may include its own cleaning liquid tank. In this case, it is possible to install this driving assistance system 1 relatively easily inside any element 2 of the vehicle 100 such as a bodywork element or on any exterior element of the vehicle 100 such as for example the front or rear bumper or the wing mirrors, without necessitating a long and complex initial design process at the level of the vehicle 100 to connect the protection device 3 to the cleaning liquid system of the vehicle 100 in order to feed the nozzle 22 (FIG. 6).

Where the actuator 5 seen in FIGS. 2 and 4*a*, 4*b* is concerned, this is in particular an actuator 5 mounted to rotate about a rotation axis A2.

The actuator 5 includes for example an electric motor for driving the housing 4. By way of nonlimiting example this may more particularly be a brushless motor.

The motor may have a rotation speed between 1000 and 50000 revolutions/minute inclusive, preferably between 5000 and 20000 revolutions/minute inclusive, and more preferably between 7000 and 15000 revolutions/minute inclusive. Such rotation speeds enable the elimination by a centrifugal effect of any dirt that may have been deposited on the optical element 9 and therefore enable the optic 14 of the optical sensor 13 to be kept clean to assure optimum operation of the driving assistance system 1.

The actuator 5 is for example electrically powered by a power supply connected to the general electrical circuit of the vehicle 100 (FIG. 1).

The protection device 3 may optionally include elements making it possible to limit any noise nuisance from the actuator 5 in order not to inconvenience the occupants inside the vehicle 100 or other users during use of the protection device 3 because of the high rotation speeds of the actuator 5.

The actuator 5 is outside the rotatable housing 4 accommodating the optical sensor 13 and the output shaft of this actuator is at a distance from this housing that it drives in rotation. A wall 21 of the housing 4, either a side wall or rear wall, i.e. a wall parallel to the rotation axis A1 of the housing or opposite the optical element 9, is more particularly disposed between the optical sensor 13 and the actuator 5.

The actuator 5, thus arranged at a distance from the housing 4, is coupled to the latter by way of a coupling means 7 between the housing 4 and the actuator 5. This coupling means 7 includes a part 71 situated at the rear of the housing 4, in other words on the opposite side to the optical element 9. This part 71 consists in particular of a toothed pinion on the exterior face of a wall 21 delimiting the housing and more particularly at the level of the distal longitudinal end of that housing, i.e. the end of the housing opposite the optical element.

In the variant shown in FIGS. 2 to 4*b* this actuator 5 may be arranged alongside the housing 4. In this case, the rotation axis A2 of the actuator 5 does not coincide with the rotation axis A1 of the housing 4. The two rotation axes A1 and A2 may be substantially parallel. Here the actuator outside the housing, alongside the latter, is able to cooperate with a lateral wall of the housing.

In particular, the coupling means 7 may include gears comprising a first toothed pinon 71 and a second toothed pinon 73 that are complementary to one another.

The first toothed pinion 71 is mounted on the housing 4, at the rear of the housing 4. The second toothed pinion 73 is mounted on the actuator 5, at the rear of the actuator 5, i.e. so as to be on the interior side of the vehicle 100 (FIG. 1) at the greatest distance from the road scene. The teeth of the second toothed pinion 73 are formed on the exterior circumference of the second toothed pinion 73 and mesh with teeth formed on the exterior circumference of the first toothed pinion 71 so as to transmit movement in rotation of the actuator 5 to the housing 4 (see FIGS. 2 to 4*b*).

Any other coupling means 7 may be envisaged, of course. By way of nonlimiting example the coupling means 7 may be chosen from a ring, a roller, a belt or an elastic drive cylinder or a magnetic system. In this latter embodiment, there is advantageously no contact between the various parts that cause the housing 4 to rotate. Wear of the coupling means 7 can therefore be limited.

Also, the protection device 3 may in particular include one or more bearings 27, 29 represented schematically in FIG. 2. The bearings 27, 29 are of substantially annular general shape.

In the example shown in FIG. 2 the protection device 3 includes two bearings 27, 29. A first bearing 27, enabling rotation of the housing 4 relative to the fixing plate 41, is disposed outside the housing 4 between the optical element 9 and the fixing plate 41. A second bearing 29, enabling rotation of the housing 4 relative to the optical sensor 13, is inside the housing 4, between the housing 4 and the optical sensor 13. In particular, the connecting part 16 of the optical sensor 13 is disposed between the body of the optical sensor 13 and the second bearing 29.

A second embodiment of a device 103 for protecting the optical sensor 13 is described with reference to FIGS. 7*a* to 7*c*. Only the differences between the second embodiment and the first embodiment described with reference to FIGS. 1 to 6 are described in detail hereinafter. This second embodiment differs from the first embodiment in particular by the arrangement of the actuator 5, it being understood that the actuator is still outside the housing 4 and coupled to the latter by a coupling means 107.

In this second embodiment the actuator 5 is more particularly downstream of the housing 4, at the rear of the latter, in other words on the opposite side to the optical element 9. As stated above, the actuator is outside the housing in the sense that the output shaft of this actuator is at a distance from the housing that it is to render mobile in translation. In the situation shown here the rotation axis A2 of the actuator 5 may coincide with the rotation axis A1 of the housing 4 and therefore with the optical axis 15. In other words, the actuator 5 is coaxial with the housing 4 and the optical sensor 13.

In a similar manner to the first embodiment, the actuator 5 is coupled to the housing 4 by a coupling means 107. In this second embodiment the coupling means 107 is arranged at least in part at the rear of the housing 4, in other words on the opposite side to the optical element 9.

The coupling means 107 may in particular include gears, to be more precise a gear train. By way of nonlimiting example, the gear train may comprise a first toothed pinion 71, a second toothed pinion 73 and supplementary third and fourth toothed pinions 75, 77 mounted on a shaft 79 parallel to the axes of the first and second toothed pinions 71, 73. The first toothed pinion 71 is mounted on the housing 4, at the rear of the housing 4.

The second toothed pinion 73 is mounted on the actuator 5, at the front of the actuator 5, so as to face the first toothed pinion 71. The teeth of the first toothed pinion 71 are formed on the exterior circumference of the first toothed pinion 71 and mesh with teeth formed on the exterior circumference of the third toothed pinion 75 and the teeth of the fourth toothed pinion 77 constrained to rotate with the third toothed pinion 75 mesh with teeth formed on the exterior circumference of the second toothed pinion 73 so as to transmit movement in rotation of the actuator 5 to the housing 4.

As shown schematically in FIG. 7*b*, the first and second toothed pinions 71, 73 may be configured to turn in a first rotation direction R1 whilst the third and fourth toothed pinions 75, 77 may be configured to turn in a second rotation direction R2 opposite the first rotation direction R1. In this nonlimiting example the rotation direction R1 may be an anticlockwise rotation direction and the second rotation direction R2 may be a clockwise rotation direction.

Of course, in a similar manner to the first embodiment, any other coupling means 107 may be envisaged.

The rest of the description with reference to FIGS. 2 to 6 of the first embodiment concerning the housing 4, the bearings 27, 27 and the optical element 9 applies to this second embodiment.

Also, the protection device 103 according to this second embodiment may equally be mounted on an element 2 of the vehicle 100 (FIG. 1) by way of a retaining and fixing means including for example a first fixing plate 41 and a second fixing plate 48 (FIGS. 7*a* to 7*c*).

In this example the means for retaining and fixing the protection device 103 according to this second embodiment includes no unit 40 as described with reference to FIGS. 2 to 4*a*.

The first fixing plate 41 is similar to the fixing plate 41 described above with reference to FIGS. 2 to 4*b* and 6 for mounting the protection device 3 according to the first embodiment on an element 2 of the vehicle 100 (FIG. 1).

The second fixing plate 48 (FIGS. 7*a* to 7*c*) may be fixed to the first fixing plate 41 by any appropriate means, by way of nonlimiting example by welding, screwing or gluing it thereto. The second fixing plate 48 in this example extends substantially perpendicularly to the first fixing plate 41. This second fixing plate 48 extends for example in the lengthwise direction, facing the housing 4, the coupling means 107 and the actuator 5. The second fixing plate 48 may advantageously have a width equal to or greater than the height of the housing 4.

Also, the second fixing plate 48 may be conformed so as to define a receptacle 49 to receive at least one part of the coupling means 107, namely here the third and fourth toothed pinions 75, 77 mounted on the shaft 79. The receptacle 49 is for example defined by a depression in the second fixing plate 48. There may additionally be provided one or more, in this example two, reinforcement upstands 51. In this example these reinforcing upstands 51 extend substantially perpendicularly to the axis 79. The shaft 79 passes through these reinforcing upstands 51. To this end a notch 52 may for example be provided on each reinforcing upstand 51, seen better in FIG. 7*c*.

Finally, the actuator 5 may be fixed to the second fixing plate 48 by means of a fixing flange 53. In this example this fixing flange 53 may have a substantially "U" or stirrup shape that comes partly to surround the substantially cylindrical body of the actuator 5.

Also, in contrast to the first embodiment in which the unit 40 of the means for retaining and fixing the protection device 3 includes at the rear of the unit 40 a passage 43 for cables necessary for the operation of the optical sensor 13, according to the second embodiment shown in FIGS. 7*a* to 7*c* the cable 60 in particular for powering the optical sensor 13 exits to the rear of the optical sensor 13 and therefore to the rear of the housing 4, between the housing 4 and the actuator 5.

Also, the protection device 3 (FIG. 1 to 6) or 103 (FIGS. 7*a* to 7*c*) as described above may be used in a method of cleaning the optical element 9 of a protection device 3; 103 of this kind. The cleaning method aims in particular to eliminate by a centrifugal effect any deposits on the optical element 9, in particular on the part of the optical element 9 forming the mask 90*a*, during rotation of the housing 4 and the optical element 9 that are constrained to rotate together. Of course, in order to be able to clean by a centrifugal effect, the housing 4 and the optical element 9 are driven in rotation with a non-zero rotation speed.

To this end the driving assistance system 1 may further include an electronic control unit, not shown here, configured in particular to activate the actuator 5 in order to rotate the housing 4 and the optical element 9.

In one embodiment of the cleaning method the actuator 5 may be activated, for example by the electronic control unit, so that the housing 4 and the optical element 9 are driven in rotation continuously during operation of the vehicle 100, i.e. when moving or when stopped with the ignition switched on.

In another embodiment of the cleaning method the actuator 5 may be activated, for example by the electronic control unit, in order to rotate the housing 4 and the optical element 9 intermittently during the operation of the vehicle 100. In this embodiment the electronic control unit may for example command starting of the actuator 5 when the user of the vehicle uses a functionality of the vehicle necessitating the use of the optical sensor 13, for example when they select reverse gear when the driving assistance system is installed to enable a view to the rear of the vehicle to facilitate parking the latter.

The rotation speed of the housing 4 and of the optical element 9 may advantageously be modified during the cleaning method. For example, the electronic control unit is configured to control the actuator 5 in order to adapt the rotation speed to the speed of movement of the vehicle 100. In fact, dirt is eliminated from the optical element 9 thanks to the action of the centrifugal force linked to the rotation of the housing and the optical element 9, possibly combined with rubbing linked to the movement of the vehicle 100, in particular when the driving assistance system 1 is at the front of the vehicle 100. Accordingly, the higher the speed of movement of the vehicle 100, the less the rotation speed of the housing 4 and of the optical element 9 needs to be increased to maintain a good state of cleanliness of the optical element 9 and therefore optimized operation of the optical sensor 13. The electronic control unit can therefore be configured to act on the actuator 5 so that it reduces the rotation speed of the housing 4 as the speed of the vehicle 100 increases, in particular when the optical element 9 is installed at the front of the vehicle.

In one particular embodiment the electronic control unit is configured to induce a change to the direction of rotation of the optical element 9. The electronic control unit is advantageously able to modify the rotation direction of the optical element 9 a number of times in a predefined, relatively short time period. This modification of the rotation direction favors the appearance of acceleration phenomena and enables effective elimination of any small water droplets located substantially at the center of the optical element 9 for example. In fact, the variation of the rotation direction of the optical element 9 will subject the dirt to an acceleration in the direction opposite to their movement that will facilitate their loss of adhesion to the optical element 9 and therefore their ejection from the latter.

The cleaning method may equally include at least one step of spraying at least one fluid onto the optical element 13. This spraying step may be triggered for example after the detection of dirt in the field of view V of the optical sensor 13 and/or as a function of the speed of the vehicle 100 and/or according to a time-delay.

For example, the electronic control unit may also be configured to trigger spraying of at least one fluid, for example compressed air or cleaning liquid, onto the optical element 9 with the aid of the nozzle 22 if the optical sensor 13 detects the presence of dirt at the level of its field of view V for example. In one particular embodiment the electronic control unit may be configured to trigger the spraying of compressed air onto the optical element 9 when the vehicle 100 is stopped or when it is moving slowly, i.e. at a speed less than 15 km/h, for example. In fact, in this case, the aerodynamic forces may not be sufficient to be coupled effectively to the centrifugal force of the rotation of the housing 4 and of the optical element 9 in order to eliminate water droplets and/or dirt that may be deposited on the optical element 9. In particular, at low speed or when the vehicle is stopped small water droplets situated at the center or in the vicinity of the center of the optical element 9 may be difficult to eliminate because the rotation speed of the center of the optical element 9 may be too low to reject them. The projection of compressed air onto the optical element 9 may advantageously make it possible to compensate for the absence of aerodynamic forces when the vehicle 100 is moving slowly or when it is stopped.

In another embodiment the electronic control unit may be configured to trigger the spraying of cleaning liquid and/or the projection of compressed air at the end of a certain elapsed travel time of the vehicle 100.

In a further embodiment the electronic control unit may be configured to trigger the spraying of cleaning liquid and/or the projection of compressed air at the command of the user of the vehicle.

The cleaning method may also include consecutive steps of spraying different fluids. In some embodiments the electronic control unit may be configured to trigger consecutive spraying of cleaning liquid and projection of compressed air.

In particular embodiment of the cleaning method, if the optical sensor 13 detects the presence of dirt in its field of view V despite the centrifugal effect, the electronic control unit is able to command stopping of the actuator 5 in order to stop the rotation of the housing 4 and of the optical element 9. The electronic control unit may then command the spraying of cleaning liquid by the nozzle 22 so as to detach the dirt for example. The electronic control unit is then able to command the projection of compressed air by that same nozzle 22 or by a second nozzle not shown here in order to remove dirt encrusted on the optical element 9. The electronic control unit may then reactivate the actuator 5 to rotate the housing 4 and the optical element 9 again at a rotation speed different from the initial rotation speed. In this embodiment compressed air may be projected before, simultaneously with, or after resuming rotation of the housing 4 and of the optical element 9.

The cleaning method may alternatively or additionally include at least two cleaning steps, each with a different rotation speed of the housing 4 and of the optical element 9. By way of nonlimiting example there may be:
  a first step of spraying fluid onto the optical element 9, in particular onto the part forming the mask 90a, during which the housing 4 and the optical element 9 are driven in rotation at a first rotation speed, and
  a second, drying step during which the housing 4 and the optical element 9 are driven in rotation at a second rotation speed different from the first rotation speed.

In this example the first rotation speed is advantageously lower than the second rotation speed.

Triggering the second, drying step may be subject to a time-delay.

Accordingly, in particular when spraying or applying a fluid such as cleaning liquid onto the optical element 9, the rotation speed may be relatively low, or even reduced if the housing 4 was already being driven in rotation. This makes it possible to facilitate the spreading of the cleaning liquid. After a predefined time lapse, for example a relatively short one to correspond to the time necessary to spread the cleaning liquid, the rotation speed is increased, enabling drying of the external surface 9b (see FIG. 5) of the optical element 9, in particular of the part forming the mask 90a, and also favoring the elimination of dirt moistened by the cleaning liquid.

In this kind of embodiment the quantity of fluid is advantageously clearly lower than in a classic prior art cleaning system with no rotation.

Also, the protection device 3 may further and optionally include a detection means (not shown) configured to detect the approach of an object in the vicinity of the optical element 9. The protection device 3 advantageously includes a proximity sensor, not shown here, connected to the electronic control unit. This kind of proximity sensor may be for example a capacitive proximity sensor.

The driving assistance system 1 may include means (not shown) for inhibiting rotation of the housing 4 on detection of the approach of an object in the vicinity of the optical element 9. By way of example, the capacitive proximity sensor may be configured to transmit information regarding detection of the approach of an object to the electronic control unit and the latter may include one or more processing means to receive that information and to command automatic stopping of the actuator 5 in order to stop the rotation of the housing 4 and of the optical element 9. This therefore limits the risk that the optical element 9 will be damaged if it comes into contact with an object because of its rotation, in particular if the driving assistance system 1 is intended to be installed at the level of the front or rear bumper of the vehicle 100.

The above embodiments are provided by way of nonlimiting illustration. In fact, it is possible for the person skilled in the art, without departing from the scope of the invention, to replace the actuator 5 described here with any other type of actuator enabling rotation of the optical element 9. For example, the person skilled in the art may without departing from the scope of the present invention use a transparent optical element 9 having an exterior surface having other properties making it possible to limit the adhesion of dirt to that external surface. It is also entirely possible for the person skilled in the art, without departing from the scope of the present invention, to use any type of coupling means 7 to rotate the optical element 9, that coupling means 7 being mechanical or magnetic for example.

There is therefore obtained a field of view for the optical sensor 13 that is at all times clean and free. In fact, in operation, the actuator 5 drives the housing 4 and the optical element 9 fastened to the housing 4 in rotation relative to the optical sensor 13. This rotation is possible in particular thanks to the coupling means 7 and to the bearings 27, 29. The rotation of the housing 4 and of the optical element 9 eliminates dirt because of the centrifugal force to which the latter is subjected. Also, the fact that the rotation axis A1 of the housing 4 and of the element 9 coincides with the optical axis 15 of the optical sensor 13 makes it possible to adapt this system to any type of optical sensor 13 intended to be integrated into a vehicle 100 whilst preserving a wide angle of view.

The invention claimed is:

1. A device for protecting a motor vehicle optical sensor, the protection device comprising:
   a housing mounted to be mobile in rotation about a rotation axis, the housing including a receptacle configured to receive the optical sensor so that an optical axis of the optical sensor coincides with the rotation axis;
   a transparent optical element constrained to rotate with the housing and configured to be disposed in front of the housing facing a road scene, the optical sensor configured to participate in imaging, and the transparent optical element centered relative to the optical sensor; and
   an actuator coupled to the housing by a coupling means selected from a group consisting of gears, a gear train, a belt, an elastic drive cylinder, and a roller, to drive the housing in rotation, wherein,
   the actuator cleans the optical element using a centrifugal effect generated from the actuator's rotation of the housing, and
   the actuator is disposed outside the housing.

2. The protection device as claimed in claim 1, in which the receptacle for the optical sensor is defined by a wall of the housing.

3. The protection device as claimed in claim 2, in which the wall is centered around the rotation axis of the housing.

4. The protection device as claimed in claim 1, in which the housing includes at least one through-orifice.

5. The protection device as claimed in claim 1, in which the actuator is at the rear of the housing.

6. The protection device as claimed in claim 1, in which the actuator is on one side of the housing.

7. The protection device as claimed in claim 1, in which the coupling means is at least in part disposed on the side opposite said optical element.

8. The protection device as claimed in claim 6, in which the coupling means is disposed on an external face of a wall delimiting the housing, the wall being parallel to the rotation axis of the housing of the optical sensor.

9. The protection device as claimed in claim 1 in which said optical element is distinct from the optical sensor.

10. The protection device as claimed in claim 1, in which said optical element has an internal surface having an anti-mist property, wherein the internal surface of said optical element has an anti-mist coating.

11. The protection device as claimed in claim 1, in which said optical element has an external surface having at least one property chosen from the following list:
   infrared filter, photocatalytic, hydrophobic, superhydrophobic, lipophobic, hydrophilic, superhydrophilic, gravel resistance.

12. A driving assistance system including an optical sensor comprising a protection device for the optical sensor as claimed in claim 1.

13. A method of cleaning an optical element of a protection device, said method comprising:
   cleaning a housing and said optical element using a centrifugal effect by driving in rotation the housing and the optical element using an actuator at a first speed; and
   cleaning the housing and the optical element using the centrifugal effect by driving the actuator at a second speed different from the first speed,
   wherein the protection device comprises:
      the housing mounted to be mobile in rotation about a rotation axis, the housing including a receptacle configured to receive the optical sensor so that an optical axis of the optical sensor coincides with the rotation axis,
      a transparent optical element constrained to rotate with the housing and configured to be disposed in front of the housing facing a road scene, the optical sensor configured to participate in imaging, and the transparent optical element centered relative to the optical sensor, and the actuator, wherein the actuator is coupled to the housing by a coupling means selected from a group consisting of gears, a gear train, a belt, an elastic drive cylinder, and a roller, and the actuator is disposed outside the housing.

* * * * *